Jan. 12, 1960 R. SÖMMER 2,920,504
MULTI-SPEED TRANSMISSION SYSTEM
Filed April 11, 1958 2 Sheets-Sheet 1

INVENTOR:
REINHOLD SÖMMER
BY
AGENT

Jan. 12, 1960   R. SÖMMER   2,920,504
MULTI-SPEED TRANSMISSION SYSTEM
Filed April 11, 1958   2 Sheets-Sheet 2

INVENTOR:
REINHOLD SÖMMER
BY
AGENT

United States Patent Office 2,920,504
Patented Jan. 12, 1960

2,920,504

MULTI-SPEED TRANSMISSION SYSTEM

Reinhold Sömmer, Nordhausen, Harz, Germany, assignor to VEB Schlepperwerk Nordhausen, Nordhausen, Harz, Germany, a corporation of Germany Application April 11, 1958, Serial No. 727,922

Claims priority, application Germany October 19, 1957

9 Claims. (Cl. 74—745)

The present invention relates to a multi-speed transmission system for automotive vehicles.

It is known that certain vehicles, such as agricultural tractors, have to be provided with a plurality of speeds, generally seven to eight forward speeds, in order to operate the engine at various driving speeds always within the range of its most economic load, i.e. with the lowest possible fuel consumption. Creeping speeds have been found particularly useful for agricultural work which is to be carried out at a relatively slow cycle, as required for instance in plant setting or beet-root extraction.

Such vehicles generally have special reduction gears or group gears associated with their speed-changing means for redoubling the number of available speeds. The transmission systems of the above character have certain disadvantages, among them objectionably elongated construction, overlapping speed ranges and unnecessary duplication of the reverse speed.

There are other known transmission constructions in which a special reduction gear has been incorporated between the intermediate and the output shaft so that one speed or two speeds only are involved in the additional reduction; the structural length of these transmissions is, however, still in excess of the normal. In addition, these combined transmissions have the disadvantage of structural complexity involving considerable manufacturing costs because of the presence of at least four additional gears. Furthermore, operators find it impractical to use two control levers for shifting into creeping speed; on the other hand, the switching system becomes unduly intricate if all speeds are controlled by a single lever.

It is an object of the present invention to overcome these drawbacks and to provide a multi-speed transmission system for automotive vehicles which is of limited dimensions and simple construction and which provides an additional low gear or creeping speed.

A feature of this invention is the provision of a transmission system comprising an input shaft, an output shaft, an intermediate shaft and reversing and speed-reducing mechanism, the latter preferably including a slidable reversing gear and a pair of spur wheels. This mechanism is operable to couple the intermediate shaft with the output shaft in such manner that the same will be driven either in reverse or in substantially sloweddown forward direction. For the usual forward speeds, the torque of the input shaft is transmitted to the output shaft through a conventional gear shift or other speed-changing device.

Given an arrangement of this type, the number of gears required for reversing and reducing purposes will be increased by only two, with several forward speeds, a reverse and a creeping speed, as compared with the number required in a conventional transmission system not provided with supplemental reduction-gear means.

Another feature of the present invention is the provision of means for obtaining a high-speed forward drive by clutching the input shaft to the output shaft directly, i.e. in a manner bypassing the intermediate shaft and its speed-changing device.

A further important feature of the transmission of this type is that a single gearshift lever controls all the forward speeds, including the high-speed forward drive, while a special reverse/creeping control lever operates the reversing and reduction drives. A suitable lockout device advantageously prevents either of these levers from being shifted when the other is not in its neutral position. This insures virtually foolproof operation, enables a convenient control-lever arrangement and avoids objectionable jolts and shocks which might occur in case of hasty or inadvertent manipulation.

As an additional feature, the transmission system may be provided with a detachable support for the pair of spur wheels for the creeping speed, enabling their removal without any disassembly of the transmission system and also facilitating the addition of gears to the input, output and/or intermediate shafts. Owing to this versatile construction the creeping speed can be added as an attachment at any later time to a multi-speed transmission system of this type.

The above and other features will become more fully apparent from the following detailed description, given with reference to the accompanying drawing in which.

Figure 1:
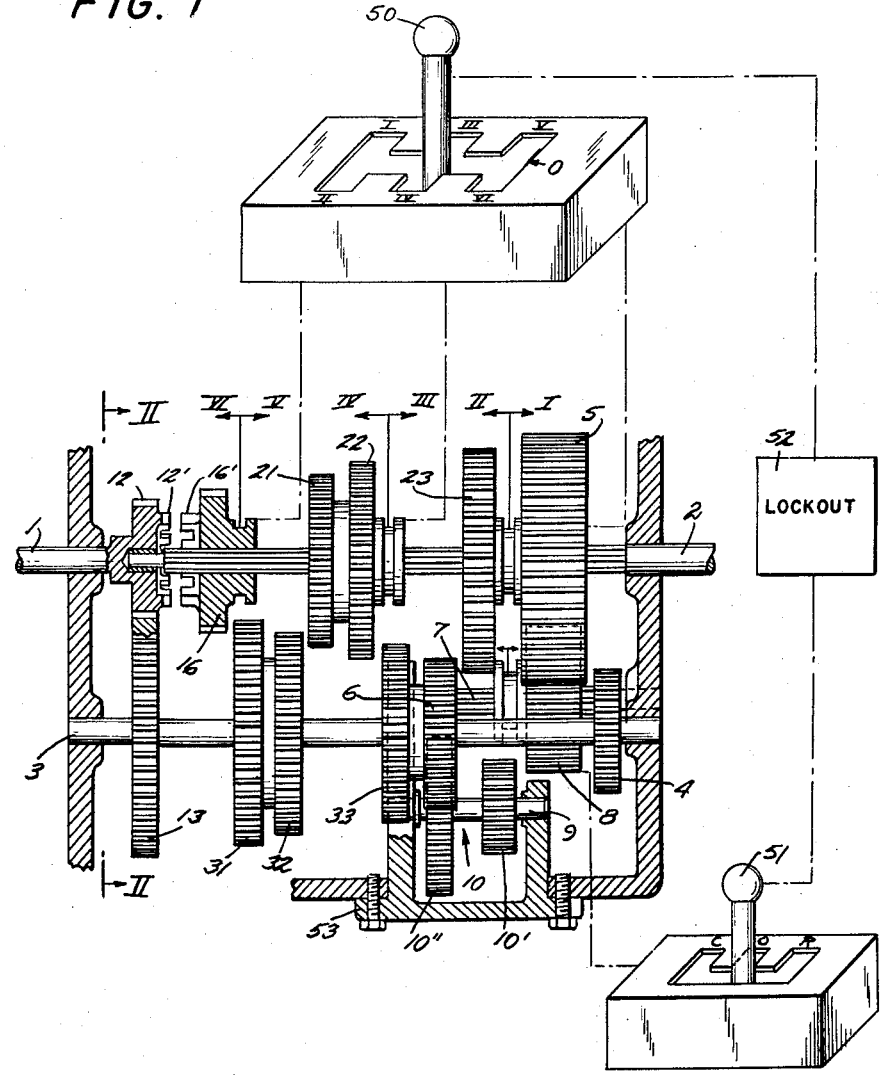
Fig. 1 illustrates a multi-speed transmission system according to the invention, having six forward speeds, a reverse speed and an additional creeping forward speed, in axial section.

In the drawing, an input shaft 1 is aligned with a splined output shaft 2. Shaft 1 carries a gear 12 which is in constant mesh with a gear 13 on an intermediate shaft 3. The output shaft 2 is driven by gear 13 via a conventional speed changer comprising axially slidable gears 16, 21, 22, 23 and 5 on shaft 2, designed for selective engagement of the fixed gears 31, 32, 33, 6 and 4 on shaft 3. The positioning of the slidable gears can be controlled by the usual gearshift lever, schematically shown at 50, as indicated by the arrows. The number of gear pairs can be increased at will to provide a desired number of forward speeds.

An additional high-speed direct drive can be achieved by the interengagement of dogs 12' and 16' on gears 12 and 16, respectively, to perform a clutching action. This operation is possible when direct-speed gear 16 is shifted by means of gearshift lever 50 all the way to the left. It will be understood that lever 50 must be so connected to gear 16 as to be able to move it into the clutching position only with gears 21, 22, 23 and 5 disengaged from gears 32, 33, 6 and 4.

An auxiliary shaft 7 is provided with a splined profile and slidably supports a reversing gear 8. This gear can be axially shifted (as indicated by the arrow) by means of a second control lever, shown schematically at 51, through a neutral center position either to the right or to the left. In its right-hand position it engages gear 4, representing the smallest of the fixed gears of the speed changer, which is rigid with intermediate shaft 3; in its left-hand position it meshes with a spur wheel 10' which, together with a second spur wheel 10'', constitutes a supplemental gear 10 mounted on an auxiliary shaft 9. Reversing gear 8 constantly engages gear 5 on output shaft 2, the largest of the slidable gears, while spur wheel 10'' constantly meshes with gear 6 on intermediate the workpiece is gripped between the headstock and the shaft 3.

Figure 2:
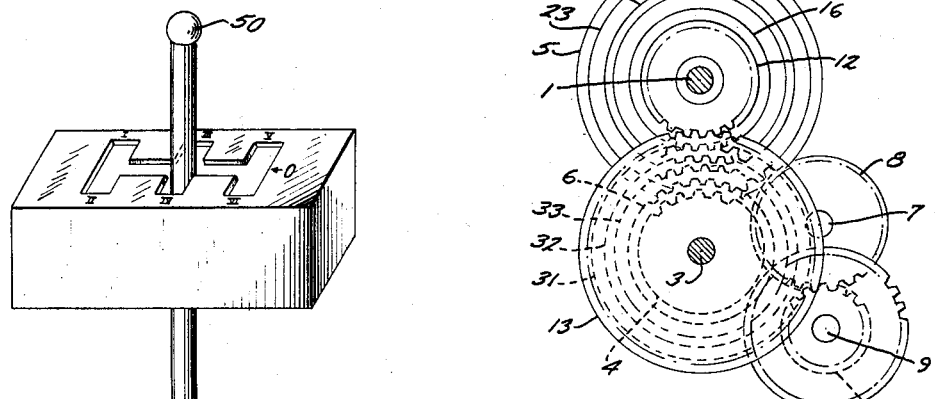
Fig. 2 is a face view of the system of Fig. 1, taken on the line II—II thereof.
Figure 3:
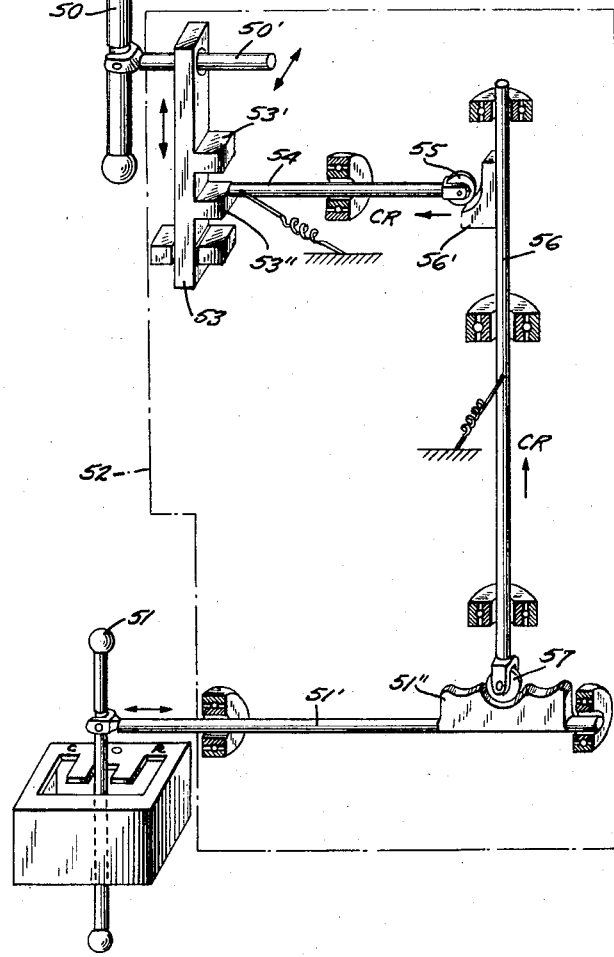
Fig. 3 schematically illustrates a lockout arrangement for the shift levers of the system shown in Fig. 1.

The levers 50 and 51 are interconnected by a lockout device 52, shown diagrammatically in Fig. 2, details of which have been illustrated in Fig. 3. A slider 53, carrying two bosses 53' and 53", is traversed by an extension 50' of lever 50 so that the space between these bosses is in line with a spring-loaded arm 54 only when lever 50 is in its neutral position (O). Arm 54 carries a roller 55 which co-acts with a cam 56' on a rod 56, the latter being spring-urged in a downward direction so that a roller 57 carried thereon engages a cam 51" on an extension 51' of lever 51. When lever 51 is displaced from its neutral position (O), its cam 51" raises the rod 56 so that cam 56' moves the arm 54 to the left, thereby blocking the slider 53 and preventing lever 50 from occupying any of its six operating positions (I–VI) in which one of the slidable gears on shaft 2 engages a fixed gear on shaft 3 or, in the case of gear 16, establishes a direct clutching connection with gear 12. Conversely, when lever 50 is operated with lever 51 in neutral, leftward movement of arm 54 is blocked so that lever 51 can no longer be shifted into either its "creep" position (C) or its "reverse" position (R) in which the switch-over gear 8 meshes with supplemental gear member 10' or with fixed speed-changing gear 4.

In the neutral position of lever 51, gear 8 runs idle and output shaft 2 is either at standstill or in forward rotation at a speed, relative to that of input shaft 1, which is determined by the position of lever 50. With lever 50 at neutral, speed reversal is accomplished by a rightward shift of gear 8 so that the rotation of shaft 1 is now transmitted to shaft 2 via gears 12, 13, 4, 8 and 5. Creeping forward speed, on the other hand, is attained by a leftward movement of gear 8 whereby shaft 2 receives its torque from shaft 1 by way of gears 12, 13, 6, 10", 10', 8 and 5.

Supplemental gear 10, comprising spur wheels 10' and 10" on shaft 9, is mounted on a separate support 53 which may be withdrawn from the transmission system. All the forward speeds, except the reduced creeping speed, and also the reverse speed are workable when this portion of the transmission is omitted. The creeping-speed equipment can thus be purchased and installed later, as a separate attachment, without necessitating major changes on other portions of the transmission system.

Some of the features described above have also been disclosed in my co-pending application Ser. No. 727,942, filed on even date herewith. Moreover, the invention may be realized in various modifications without departing from the spirit and scope of the appended claims. Thus it will be understood, for example, that the input could be applied direct to shaft 3 and that in such case the shaft 1 might be omitted if the direct-drive clutching action between gears 12 and 16 is not required, thus leaving shaft 3 as the only continuously driven shaft of the system.

I claim:

1. A transmission system comprising a drive shaft, an output shaft, speed-changing means for operatively interconnecting said shafts at different speed ratios, said speed-changing means including first gear means on said drive shaft and second gear means on said output shaft, an auxiliary shaft, third gear means on said auxiliary shaft, and switch-over means, said switch-over means comprising a gear shiftable between a first position in mesh with said first gear means and a second position in mesh with said third gear means, said shiftable gear meshing with said second gear means in both of said positions, said third gear means being in continuous mesh with said first gear means, said first gear means being selectively engageable with said second gear means directly in said second position and through said shiftable gear in said first position.

2. A system according to claim 1 wherein said first gear means includes two first gears fixed on said drive shaft, said third gear means including two third gears fixed on said auxiliary shaft, one of said third gears meshing with one of said first gears, said shiftable gear being alternately engageable with the other of said first and third gears.

3. A system according to claim 2 wherein said second gear means includes a gear axially displaceable on said output shaft into and out of engagement with one of said first gears.

4. A system according to claim 1 wherein said shiftable gear has a neutral position out of engagement with said first and third gear means, said first gear means being directly engaged with said second gear means in said neutral position.

5. A system according to claim 4, further comprising lockout means coupled with said shiftable gear and with said speed-changing means for permitting interconnection of said drive and output shafts only in said neutral position of said shiftable gear and for permitting displacement of said shiftable gear into either of its other positions only upon inactivation of said speed-changing means.

6. A system according to claim 1, further comprising a removable support for said auxiliary shaft enabling disengagement of said third gear means from the rest of the system.

7. A system according to claim 1, further comprising an input shaft, coupling means operatively connecting said drive shaft with said input shaft, and direct-drive means operable in an inoperative position of said speed-changing means for connecting said output shaft directly to said input shaft.

8. A transmission system according to claim 1 wherein said third gear means is dimensioned to turn said output shaft at a speed ratio lower than that obtainable through said speed-changing means.

9. A transmission system comprising a drive shaft, a driven shaft, a plurality of progressively larger fixed gears on said drive shaft, a plurality of progressively smaller axially shiftable gears on said driven shaft selectively engageable with respective ones of said fixed gears, an auxiliary shaft a relatively large gear and a relatively small gear on said auxiliary shaft, said relatively large gear being in mesh with the second-smallest one of said fixed gears, and a further gear shiftable into alternate engagement with the smallest one of said fixed gears and with said relatively small gear, said further gear being in constant mesh with the largest one of said shiftable gears.

References Cited in the file of this patent
UNITED STATES PATENTS

| | | |
|---|---|---|
| 1,756,123 | Jarrett et al. | Apr. 29, 1930 |
| 2,096,211 | Tenney | Oct. 19, 1937 |
| 2,531,701 | Price | Nov. 28, 1950 |